United States Patent
Nammi et al.

(10) Patent No.: US 11,121,750 B2
(45) Date of Patent: *Sep. 14, 2021

(54) LAYER MAPPING SUBSET RESTRICTION FOR 5G WIRELESS COMMUNICATION SYSTEMS

(71) Applicant: AT&T Intellectual Property I, L.P., Atlanta, GA (US)

(72) Inventors: SaiRamesh Nammi, Kista (SE); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,844

(22) Filed: Apr. 14, 2020

(65) Prior Publication Data
US 2020/0244323 A1   Jul. 30, 2020

Related U.S. Application Data

(63) Continuation of application No. 16/505,975, filed on Jul. 9, 2019, now Pat. No. 10,666,330, which is a
(Continued)

(51) Int. Cl.
*H04L 25/03*    (2006.01)
*H04B 7/0456*   (2017.01)
(Continued)

(52) U.S. Cl.
CPC ......... *H04B 7/0473* (2013.01); *H04B 7/0417* (2013.01); *H04B 7/0486* (2013.01);
(Continued)

(58) Field of Classification Search
CPC .. H04B 7/0473; H04B 7/0665; H04B 7/0626; H04B 7/0862; H04B 7/0417;
(Continued)

(56) References Cited

U.S. PATENT DOCUMENTS 5,852,630 A * 12/1998 Langberg ............ H04L 27/2647
                                                          375/219
9,059,820 B2    6/2015 Koo et al.
(Continued)

FOREIGN PATENT DOCUMENTS

| CN | 102255684 A | 8/2013 |
| EP | 3 148 095 A1 | 3/2017 |
| WO | 2012144842 A2 | 10/2012 |

OTHER PUBLICATIONS

U.S. Appl. No. 16/505,975, filed Jul. 9, 2019.
(Continued)

*Primary Examiner* — Kenneth T Lam
(74) *Attorney, Agent, or Firm* — Amin, Turocy & Watson, LLP

(57) ABSTRACT

Various embodiments disclosed herein provide for a base station device that can determine which layers should be mapped to codewords in a multi-layer, multi-antenna transmission. The base station device can transmit reference signals to a user equipment device, with each reference signal associated with a respective codeword to layer mapping combination, and the user equipment can send channel state information associated with each reference signal back to the base station device, and the base station device can rank each combination in terms of spectral efficiency or capacity and/or throughput. The base station device can inform the user equipment of the ranked combinations by sending a bit map with the ranked combinations to the user equipment device.

20 Claims, 10 Drawing Sheets

Related U.S. Application Data continuation of application No. 15/624,350, filed on Jun. 15, 2017, now Pat. No. 10,396,871.

(51) Int. Cl.
| | |
|---|---|
| *H04B 7/08* | (2006.01) |
| *H04B 7/06* | (2006.01) |
| *H04B 7/0417* | (2017.01) |
| *H04W 88/02* | (2009.01) |
| *H04W 88/08* | (2009.01) |

(52) U.S. Cl.
CPC ......... *H04B 7/0626* (2013.01); *H04B 7/0665* (2013.01); *H04B 7/0862* (2013.01); *H04L 25/03929* (2013.01); *H04L 25/03936* (2013.01); *H04L 25/03955* (2013.01); *H04W 88/02* (2013.01); *H04W 88/08* (2013.01)

(58) Field of Classification Search
CPC ............ H04B 7/0486; H04L 25/03929; H04L 25/03936; H04L 25/03955; H04W 88/02; H04W 88/08

See application file for complete search history.

(56) References Cited

U.S. PATENT DOCUMENTS

| | | | |
|---|---|---|---|
| 9,397,796 B2 | 7/2016 | Papasakellariou | |
| 9,554,394 B2 | 1/2017 | Li et al. | |
| 9,629,105 B2 | 4/2017 | Yeon et al. | |
| 9,838,099 B2 | 12/2017 | Goransson et al. | |
| 10,396,871 B2* | 8/2019 | Nammi | H04B 7/0862 |
| 10,666,330 B2* | 5/2020 | Nammi | H04B 7/0486 |
| 2008/0013610 A1 | 1/2008 | Varadarajan et al. | |
| 2009/0122857 A1 | 5/2009 | Li et al. | |
| 2010/0296603 A1 | 11/2010 | Lee et al. | |
| 2011/0268080 A1 | 11/2011 | Luo et al. | |
| 2011/0317778 A1 | 12/2011 | Hooli et al. | |
| 2012/0134338 A1 | 5/2012 | Ko et al. | |
| 2012/0140708 A1 | 6/2012 | Choudhury et al. | |
| 2012/0147833 A1 | 6/2012 | Park | |
| 2012/0300711 A1 | 11/2012 | Wang et al. | |
| 2013/0022142 A1 | 1/2013 | Nammi | |
| 2013/0094548 A1 | 4/2013 | Park | |
| 2013/0114656 A1 | 5/2013 | Sayana et al. | |
| 2013/0215858 A1 | 8/2013 | Jang et al. | |
| 2014/0010321 A1 | 1/2014 | Kang et al. | |
| 2014/0078997 A1 | 3/2014 | Zhang et al. | |
| 2015/0030058 A9* | 1/2015 | Varadarajan | H04B 7/0417 375/221 |
| 2015/0146696 A1 | 5/2015 | Golitschek Edler Von Elbwart et al. | |
| 2015/0215018 A1* | 7/2015 | Xiong | H04W 72/06 370/329 |
| 2015/0358060 A1 | 12/2015 | Park et al. | |
| 2016/0197662 A1 | 7/2016 | Wu et al. | |
| 2016/0337056 A1 | 11/2016 | Frenne et al. | |
| 2016/0359647 A1 | 12/2016 | Chen et al. | |
| 2017/0099090 A1 | 4/2017 | Liu et al. | |
| 2017/0126376 A1 | 5/2017 | Wang et al. | |
| 2017/0135086 A1 | 5/2017 | Hammarwall et al. | |
| 2018/0026757 A1 | 1/2018 | Chung et al. | |
| 2018/0054281 A1 | 2/2018 | Nammi | |
| 2018/0159707 A1 | 6/2018 | Onggosanusi et al. | |

OTHER PUBLICATIONS

U.S. Appl. No. 15/624,350, filed Jun. 15, 2017.
Non-Final Office Action received for U.S. Appl. No. 15/624,350 dated Feb. 26, 2018, 27 pages.
Final Office Action received for U.S. Appl. No. 15/624,350 dated Jul. 6, 2018, 20 pages.
Ex-Parte Quayle office action received for U.S. Appl. No. 15/624,350 dated Oct. 19, 2018, 11 pages.
International Search Report and Written Opinion received for PCT Application Serial No. PCT/US2018/032461 dated Aug. 17, 2018, 17 pages.
LG Electronics. "Discussion on codeword mapping." 3GPP TSG RAN WGl Meeting #89, Hangzhou, China, May 15-19, 2017. 4 pages.
AT&T. "Remaining issue for CW to Layer mapping." 3GPP TSG RAN WGl Meeting #89, May 15-19, 2017 Hangzhou, P. R China. 13 pages.
Notice of Allowance received for U.S. Appl. No. 15/624,350 dated Apr. 10, 2019, 32 pages.
Non-Final Office Action received for U.S. Appl. No. 16/505,975 dated Oct. 30, 2019, 37 pages.
International Preliminary Report on Patentability received for PCT Application Serial No. PCT/US2018/032461 dated Dec. 26, 2019, 10 pages.
Korean Office Action for Korean Application No. 10-2019-7037051 dated Jan. 19, 2021.
Indian Office Action for Indian Application No. 201947053118 dated Jan. 29, 2021.
Notice of Reasons for Refusal dated Apr. 19, 2021 for Japanese Application No. 2019-569700, 6 pages.
European Office Action for European Application No. 187330022 dated Jun. 22, 2021, 4 pages.

* cited by examiner

LAYER MAPPING SUBSET RESTRICTION FOR 5G WIRELESS COMMUNICATION SYSTEMS

RELATED APPLICATION

The subject patent application is a continuation of, and claims priority to each of, U.S. patent application Ser. No. 16/505,975 (now U.S. Pat. No. 10,666,330), filed Jul. 9, 2019, and entitled "LAYER MAPPING SUBSET RESTRICTION FOR 5G WIRELESS COMMUNICATION SYSTEMS," which is a continuation of U.S. patent application Ser. No. 15/624,350 (now U.S. Pat. No. 10,396,871), filed Jun. 15, 2017, and entitled "LAYER MAPPING SUBSET RESTRICTION FOR 5G WIRELESS COMMUNICATION SYSTEMS," the entireties of which applications are hereby incorporated by reference herein.

TECHNICAL FIELD

The present application relates generally to the field of mobile communication and, more specifically, to mapping codewords to layers in a multi-antenna transmission in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
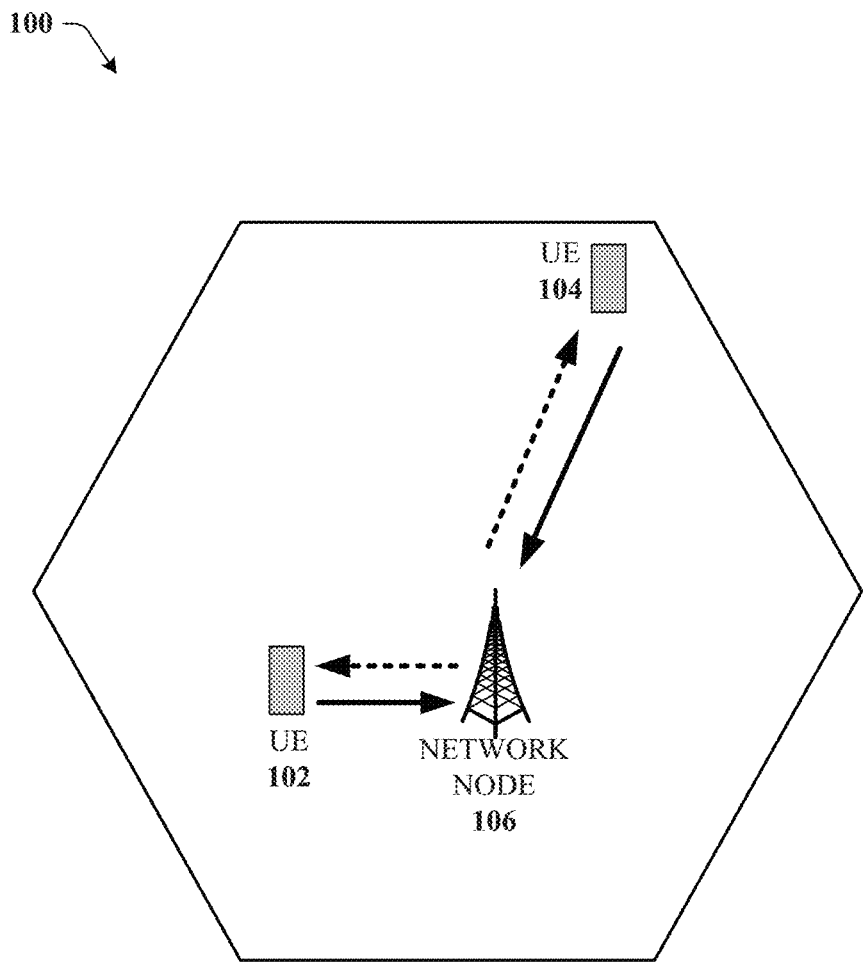
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a base station device that can determine which layers should be mapped to codewords in a multi-layer, multi-antenna transmission. The base station device can transmit reference signals to a user equipment device, with each reference signal associated with a respective codeword to layer mapping combination, and the user equipment can send channel state information associated with each reference signal back to the base station device, and the base station device can rank each combination in terms of spectral efficiency or capacity and/or throughput. The base station device can inform the user equipment of the ranked combinations by sending a bit map with the ranked combinations to the user equipment device.

In traditional dynamic mapping, the user equipment device can perform the computations in order to determine the ideal mapping, but this can be resource intensive and cause increased battery drain. By allowing the base station device to perform the computations and then inform the user equipment device via a bit map, increased battery life can be realized at the user equipment device.

In various embodiments, a base station device can comprise a processor and a memory that stores executable instructions that, when executed by the processor facilitate performance of operations. The operations can comprise receiving a channel state information report from a user equipment device. The operations can also include determining a ranking of codeword to layer mapping combinations based on the channel state information report, wherein the codeword to layer mapping combinations indicate to which antenna of a multi-antenna transceiver on the user equipment device to map each codeword of a transmission. The operations can also comprise facilitating transmitting, to the user equipment device, bit map data representative of a bit map comprising the ranking.

In another embodiment, method comprises receiving, by a base station device comprising a processor, a channel state information report from a mobile device. The method can also comprise ranking, by the base station device, a group of codeword to layer mapping combinations based on the channel state information report, wherein the codeword to layer mapping combinations indicate to which antenna of a multi-antenna transceiver of the mobile device to map each codeword of a transmission. The method can also comprise transmitting, by the base station device to the mobile device, a bit map comprising the ranked group of codeword to layer mapping combinations.

In another embodiment machine-readable storage medium, comprising executable instructions that, when executed by a processor of a device, facilitate performance of operations. The operations can comprise receiving a group of reference signals corresponding to a plurality of codeword to layer mapping combinations that respectively indicate to which antenna of a multi-antenna receiver of the mobile device to map respective codewords of a transmission. The operations can also comprise sending respective channel state information for the group of reference signals to a base station device. The operations can also comprise receiving bit map data representative of a bit map comprising a ranking of the codeword to layer mapping combinations. The operations can also include based on the ranking, selecting a codeword to layer mapping combination from the plurality of codeword to layer mapping combinations for use in communication with the base station device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Figure 2:
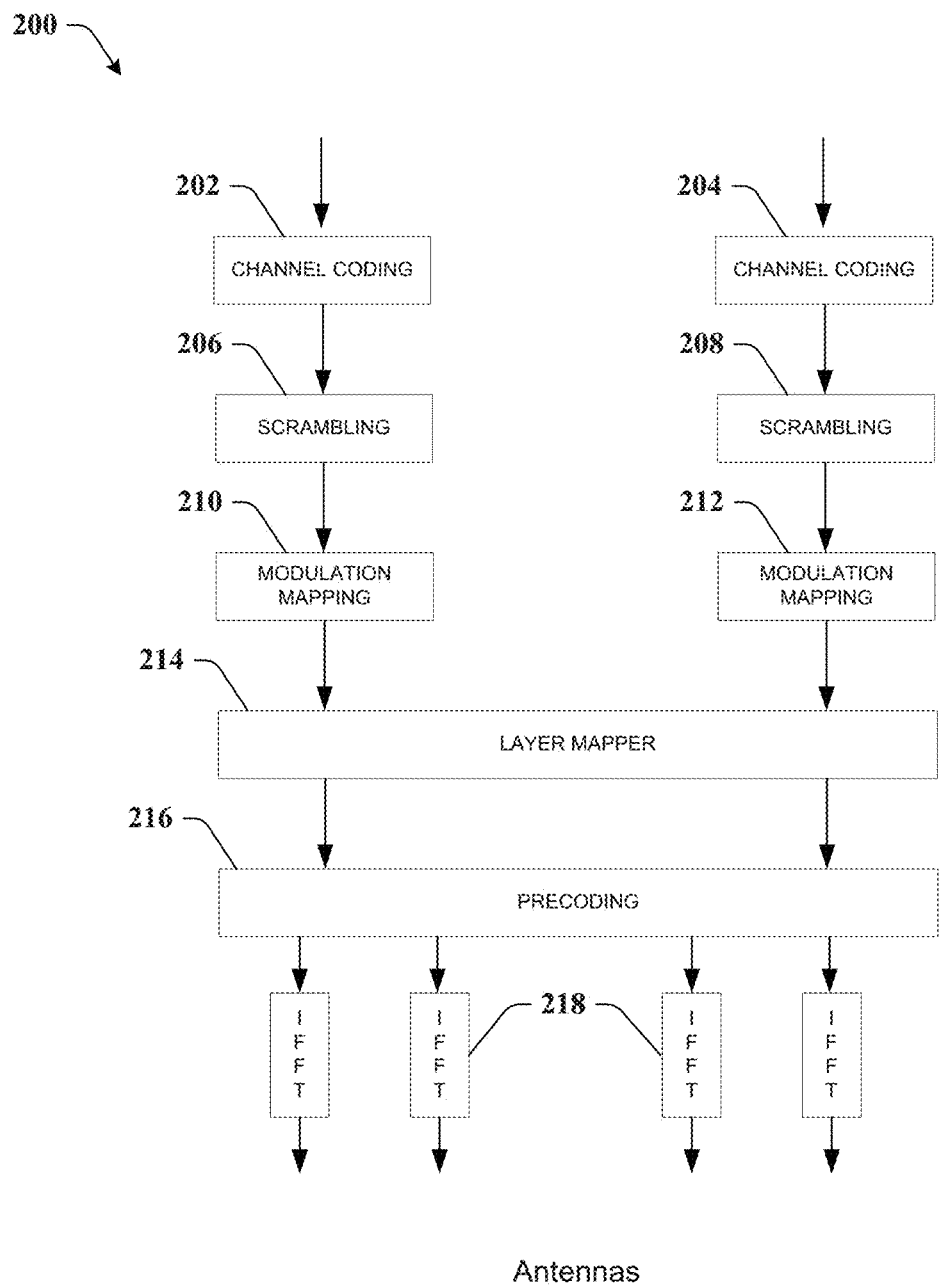
FIG. 2 illustrates an example block diagram showing MIMO transmission structure in accordance with various aspects and embodiments of the subject disclosure.

Turning now to FIG. 2, illustrated is an example block diagram 200 showing MIMO transmission structure in accordance with various aspects and embodiments of the subject disclosure.

In an embodiment, network node 106 and the UE devices 102 and 104 from FIG. 1 can be MIMO transmitters that each have a plurality of antennas (e.g., up to 8 antennas or more). In a MIMO transmitter, there are Nc transport blocks, where Nc<=Nt. CRC bits are added to each transport block and passed to the channel encoders 202 and 204. The channel encoders 202 and 204 adds parity bits to protect the data. Then the streams are passed through interleavers 206 and 208 that scramble the transport blocks. The interleaver size is adaptively controlled by puncturing to increase the data rate. The adaptation is done by using the information from the feedback channel, for example channel state information sent by the receiver. The interleaved data is passed through symbol mappers 210 and 212 (modulator). The symbol mappers are also controlled by the adaptive controller. After the symbol mappers 210 and 212, the streams are passed through a layer mapper 214 and the precoder 216. The resultant streams are then passed through IFFT (inverse fast fourier transform) block 218. Please note that IFFT block is necessary for some communication systems which implements OFDMA as the access technology (For example 5G, LTE/LTE-A), in other systems it might be different and is dependent on the multiple access system. The encoded streams are then transmitted through the respective antennas.

A quality of a channel between the network node and the user equipment device can indicate the rank of a channel, or the number of spatial layers that can be supported by the physical channel Each spatial layer can correspond to a stream through a respective antenna. To reduce overhead, a codeword dimensioning principle was introduced to bundle layers and support 2 codewords, where the codeword is defined as an information block appended with cyclic redundancy check bits. Each codeword is separately coded using Turbo coding (e.g., by coders 202 and 204), and the coded bits from each codeword are scrambled separately (e.g., by scramblers 206 and 208). The complex valued modulation symbols for each of the codewords, to be transmitted are mapped onto one or multiple layers. The complex-valued modulation symbols $d^{(q)}(0), d^{(q)}(M^{(q)}_{symb}-1)$ for code word q are mapped onto the layers $x(i)=[x^{(0)}(i) \ldots x^{(v-1)}(i)]^T=0, 1, \ldots, M^{layer}_{symb}-1$, where υ is the number of layers and $M^{layer}_{symb}$ is the number of modulation symbols per layer.

Whenever the transmission rank is higher than 2, the transport block size can be increased to accommodate the higher numbers of bits.

In an embodiment, there can be many different ways to map the codewords to the layers (e.g., codeword 1 is mapped to layers 1, 2, 3, and 4, while codeword 2 is mapped to layers 5, 6, 7, and 8). The number of combinations can be based on the rank of the transmission, with higher rank transmissions having a larger number of combinations. Using a fixed layer mapping scheme, the coded symbols are mapped from a predefined fixed mapping table similar to LTE. i.e. as shown in Table 1. Hence in this option, the transmitter and receiver both know which layers needs to be mapped to the codeword a priori based on a standardized specification. For example, take the case of 8 layer transmission, in this case, the coded symbols from layers 1-4 are mapped to the first codeword and coded symbols from layers 5-8 are mapped to the second codeword.

TABLE 1

| Number of layers | Number of codewords | Codeword-to-layer mapping $i = 0, 1, \ldots, M_{symb}^{layer} - 1$ |
|---|---|---|
| 1 | 1 | $x^{(0)}(i) = d^{(0)}(i)$ |
| 2 | 1 | $x^{(0)}(i) = d^{(0)}(2i)$ |
|   |   | $x^{(1)}(i) = d^{(0)}(2i + 1)$ |
| 3 | 1 | $x^{(0)}(i) = d^{(0)}(3i)$ |
|   |   | $x^{(1)}(i) = d^{(0)}(3i + 1)$ |
|   |   | $x^{(2)}(i) = d^{(0)}(3i + 2)$ |
| 4 | 1 | $x^{(0)}(i) = d^{(0)}(4i)$ |
|   |   | $x^{(1)}(i) = d^{(0)}(4i + 1)$ |
|   |   | $x^{(2)}(i) = d^{(0)}(4i + 2)$ |
|   |   | $x^{(3)}(i) = d^{(0)}(4i + 3)$ |
| 5 | 2 | $x^{(0)}(i) = d^{(0)}(4i)$ |
|   |   | $x^{(1)}(i) = d^{(0)}(4i + 1)$ |
|   |   | $x^{(2)}(i) = d^{(0)}(4i + 2)$ |
|   |   | $x^{(3)}(i) = d^{(0)}(4i + 3)$ |
|   |   | $x^{(4)}(i) = d^{(1)}(i)$ |
| 6 | 2 | $x^{(0)}(i) = d^{(0)}(4i)$ |
|   |   | $x^{(1)}(i) = d^{(0)}(4i + 1)$ |
|   |   | $x^{(2)}(i) = d^{(0)}(4i + 2)$ |
|   |   | $x^{(3)}(i) = d^{(0)}(4i + 3)$ |
|   |   | $x^{(4)}(i) = d^{(1)}(2i)$ |
|   |   | $x^{(5)}(i) = d^{(1)}(2i + 1)$ |
| 7 | 2 | $x^{(0)}(i) = d^{(0)}(4i)$ |
|   |   | $x^{(1)}(i) = d^{(0)}(4i + 1)$ |
|   |   | $x^{(2)}(i) = d^{(0)}(4i + 2)$ |
|   |   | $x^{(3)}(i) = d^{(0)}(4i + 3)$ |
|   |   | $x^{(4)}(i) = d^{(1)}(3i)$ |
|   |   | $x^{(5)}(i) = d^{(1)}(3i + 1)$ |
|   |   | $x^{(6)}(i) = d^{(1)}(3i + 2)$ |
| 8 | 2 | $x^{(0)}(i) = d^{(0)}(4i)$ |
|   |   | $x^{(1)}(i) = d^{(0)}(4i + 1)$ |
|   |   | $x^{(2)}(i) = d^{(0)}(4i + 2)$ |
|   |   | $x^{(3)}(i) = d^{(0)}(4i + 3)$ |
|   |   | $x^{(4)}(i) = d^{(1)}(4i)$ |
|   |   | $x^{(5)}(i) = d^{(1)}(4i + 1)$ |
|   |   | $x^{(6)}(i) = d^{(1)}(4i + 2)$ |
|   |   | $x^{(7)}(i) = d^{(1)}(4i + 3)$ |

The $x^n$ denotes the layer, whilst the $d^0$ or $d^1$ represents the first codeword and the second codeword respectively. In this fixed layer mapping scheme, therefore, for rank 8 transmissions, there are two codewords, the first codeword being mapped to layers 1-4 ($x^0$ to $x^3$) and the second codeword mapped to layers 5-8 ($x^4$-$x^7$).

In dynamic layer mapping however, instead of using the fixed layer mapping, the UE can choose which layers needs to be mapped to a codeword based on the signal to interference plus noise ratio of the channel as determined based on an analysis of the reference signal received from the base station device.

For example, at one instance say T1 for 8 layer transmission it will choose layers 1-4 for the first codeword and layers 5-8 for second codeword. In another time interval, it can recommend layers 1,3,5,7 for first codeword and layers 2,4,6,8 for second codeword. Note that the UE recommends this combination based on computations it will perform in calculating for CSI estimation. i.e., the combination which maximizes the capacity or mutual information.

The total number of combinations for rank 8 transmissions can be (8 choose 4)/2=35, for rank 7 transmissions it can be 7 choose 4=35, for rank 6 transmissions it can be 6 choose 4=15, and for rank 5 transmissions it can be 5 choose 4=5. Therefore, the total number of combinations can be up to 90 for ranks 8 through 5.

| 8 layer transmission ||||||||
|---|---|---|---|---|---|---|---|
| Index | Codeword 1 |||| Codeword 2 ||||
| 1 | 1 | 2 | 3 | 4 | 5 | 6 | 7 | 8 |
| 2 | 1 | 2 | 3 | 5 | 4 | 6 | 7 | 8 |
| 3 | 1 | 2 | 3 | 6 | 4 | 5 | 7 | 8 |
| 4 | 1 | 2 | 3 | 7 | 4 | 5 | 6 | 8 |
| 5 | 1 | 2 | 3 | 8 | 4 | 5 | 6 | 7 |
| 6 | 1 | 2 | 4 | 5 | 3 | 6 | 7 | 8 |
| 7 | 1 | 2 | 4 | 6 | 3 | 5 | 7 | 8 |
| 8 | 1 | 2 | 4 | 7 | 3 | 5 | 6 | 8 |
| 9 | 1 | 2 | 4 | 8 | 3 | 5 | 6 | 7 |
| 10 | 1 | 2 | 5 | 6 | 3 | 4 | 7 | 8 |
| 11 | 1 | 2 | 5 | 7 | 3 | 4 | 6 | 8 |
| 12 | 1 | 2 | 5 | 8 | 3 | 4 | 6 | 7 |
| 13 | 1 | 2 | 6 | 7 | 3 | 4 | 5 | 8 |
| 14 | 1 | 2 | 6 | 8 | 3 | 4 | 5 | 7 |
| 15 | 1 | 2 | 7 | 8 | 3 | 4 | 5 | 6 |
| 16 | 1 | 3 | 4 | 5 | 2 | 6 | 7 | 8 |
| 17 | 1 | 3 | 4 | 6 | 2 | 5 | 7 | 8 |
| 18 | 1 | 3 | 4 | 7 | 2 | 5 | 6 | 8 |
| 19 | 1 | 3 | 4 | 8 | 2 | 5 | 6 | 7 |
| 20 | 1 | 3 | 5 | 6 | 2 | 4 | 7 | 8 |
| 21 | 1 | 3 | 5 | 7 | 2 | 4 | 6 | 8 |
| 22 | 1 | 3 | 5 | 8 | 2 | 4 | 6 | 7 |
| 23 | 1 | 3 | 6 | 7 | 2 | 4 | 5 | 8 |
| 24 | 1 | 3 | 6 | 8 | 2 | 4 | 5 | 7 |
| 25 | 1 | 3 | 7 | 8 | 2 | 4 | 5 | 6 |
| 26 | 1 | 4 | 5 | 6 | 2 | 3 | 7 | 8 |
| 27 | 1 | 4 | 5 | 7 | 2 | 3 | 6 | 8 |
| 28 | 1 | 4 | 5 | 8 | 2 | 3 | 6 | 7 |
| 29 | 1 | 4 | 6 | 7 | 2 | 3 | 5 | 8 |
| 30 | 1 | 4 | 6 | 8 | 2 | 3 | 5 | 7 |
| 31 | 1 | 4 | 7 | 8 | 2 | 3 | 5 | 6 |
| 32 | 1 | 5 | 6 | 7 | 2 | 3 | 4 | 8 |
| 33 | 1 | 5 | 6 | 8 | 2 | 3 | 4 | 7 |
| 34 | 1 | 5 | 7 | 8 | 2 | 3 | 4 | 6 |
| 35 | 1 | 6 | 7 | 8 | 2 | 3 | 4 | 5 |

| 7 layer transmission |||||||
|---|---|---|---|---|---|---|
| Index | Codeword 1 |||| Codeword 2 |||
| 1 | 1 | 2 | 3 | 4 | 5 | 6 | 7 |
| 2 | 1 | 2 | 3 | 5 | 4 | 6 | 7 |
| 3 | 1 | 2 | 3 | 6 | 4 | 5 | 7 |
| 4 | 1 | 2 | 3 | 7 | 4 | 5 | 6 |
| 5 | 1 | 2 | 4 | 5 | 3 | 4 | 5 |
| 6 | 1 | 2 | 4 | 6 | 3 | 4 | 6 |
| 7 | 1 | 2 | 4 | 7 | 3 | 4 | 7 |
| 8 | 1 | 2 | 5 | 6 | 3 | 5 | 6 |
| 9 | 1 | 2 | 5 | 7 | 3 | 5 | 7 |
| 10 | 1 | 2 | 6 | 7 | 3 | 6 | 7 |
| 11 | 1 | 3 | 4 | 5 | 2 | 3 | 4 |
| 12 | 1 | 3 | 4 | 6 | 2 | 3 | 5 |
| 13 | 1 | 3 | 4 | 7 | 2 | 3 | 6 |
| 14 | 1 | 3 | 5 | 6 | 2 | 3 | 7 |
| 15 | 1 | 3 | 5 | 7 | 2 | 4 | 5 |
| 16 | 1 | 3 | 6 | 7 | 2 | 4 | 6 |
| 17 | 1 | 4 | 5 | 6 | 2 | 4 | 7 |
| 18 | 1 | 4 | 5 | 7 | 2 | 5 | 6 |

-continued

7 layer transmission

| Index | Codeword 1 | | | | Codeword 2 | | |
|---|---|---|---|---|---|---|---|
| 19 | 1 | 4 | 6 | 7 | 2 | 5 | 7 |
| 20 | 1 | 5 | 6 | 7 | 2 | 6 | 7 |
| 21 | 2 | 3 | 4 | 5 | 1 | 6 | 7 |
| 22 | 2 | 3 | 4 | 6 | 1 | 5 | 7 |
| 23 | 2 | 3 | 4 | 7 | 1 | 5 | 6 |
| 24 | 2 | 3 | 5 | 6 | 1 | 4 | 7 |
| 25 | 2 | 3 | 5 | 7 | 1 | 4 | 6 |
| 26 | 2 | 3 | 6 | 7 | 1 | 4 | 5 |
| 27 | 2 | 4 | 5 | 6 | 1 | 3 | 7 |
| 28 | 2 | 4 | 5 | 7 | 1 | 3 | 6 |
| 29 | 2 | 4 | 6 | 7 | 1 | 3 | 5 |
| 30 | 2 | 5 | 6 | 7 | 1 | 3 | 4 |
| 31 | 3 | 4 | 5 | 6 | 1 | 2 | 7 |
| 32 | 3 | 4 | 5 | 7 | 1 | 2 | 6 |
| 33 | 3 | 4 | 6 | 7 | 1 | 2 | 5 |
| 34 | 3 | 5 | 6 | 7 | 1 | 2 | 4 |
| 35 | 4 | 5 | 6 | 7 | 1 | 2 | 3 |

6 layer transmission

| Index | Codeword 1 | | | | Codeword 2 | |
|---|---|---|---|---|---|---|
| 1 | 1 | 2 | 3 | 4 | 5 | 6 |
| 2 | 1 | 2 | 3 | 5 | 4 | 6 |
| 3 | 1 | 2 | 3 | 6 | 4 | 5 |
| 4 | 1 | 2 | 4 | 5 | 3 | 6 |
| 5 | 1 | 2 | 4 | 6 | 3 | 5 |
| 6 | 1 | 2 | 5 | 6 | 3 | 4 |
| 7 | 1 | 3 | 4 | 5 | 2 | 6 |
| 8 | 1 | 3 | 4 | 6 | 2 | 5 |
| 9 | 1 | 3 | 5 | 6 | 2 | 4 |
| 10 | 1 | 4 | 5 | 6 | 2 | 3 |
| 11 | 2 | 3 | 4 | 5 | 1 | 6 |
| 12 | 2 | 3 | 4 | 6 | 1 | 5 |
| 13 | 2 | 3 | 5 | 6 | 1 | 4 |
| 14 | 2 | 4 | 5 | 6 | 1 | 3 |
| 15 | 3 | 4 | 5 | 6 | 1 | 2 |
|  |  |  |  |  | 5 | 6 |
|  |  |  |  |  | 4 | 6 |

5 layer transmission

| Index | Codeword 1 | | | | Codeword 2 |
|---|---|---|---|---|---|
| 1 | 1 | 2 | 3 | 4 | 5 |
| 2 | 1 | 2 | 3 | 5 | 4 |
| 3 | 1 | 2 | 4 | 5 | 3 |
| 4 | 1 | 3 | 4 | 5 | 2 |
| 5 | 2 | 3 | 4 | 5 | 1 |

It can be observed that with dynamic layer mapping, significant gain is obtained compared to the fixed layer mapping, the percentage of gains are around 18% for SNR=20 dB and 15% at SNR=25 dB. The complexity of computing the best combinations can be intense, however, and cause increased power drain on devices.

This problem can be overcome however by the embodiments provided herein that offload the computational work to determine the best combination to the base station device rather than having the user equipment devices perform the computation. The base station device can send a group of reference signals using each format (e.g., combination above) to the user equipment device which then returns a channel state information report corresponding to each reference signal. The base station device can analyze the channel state information and determine which are the best combinations, rank the combinations, and/or determine which combinations are above a predetermined threshold with regards to spectral efficiency or capacity, and send a bit map to the user equipment device with information identifying the combinations to use.

Figure 3:
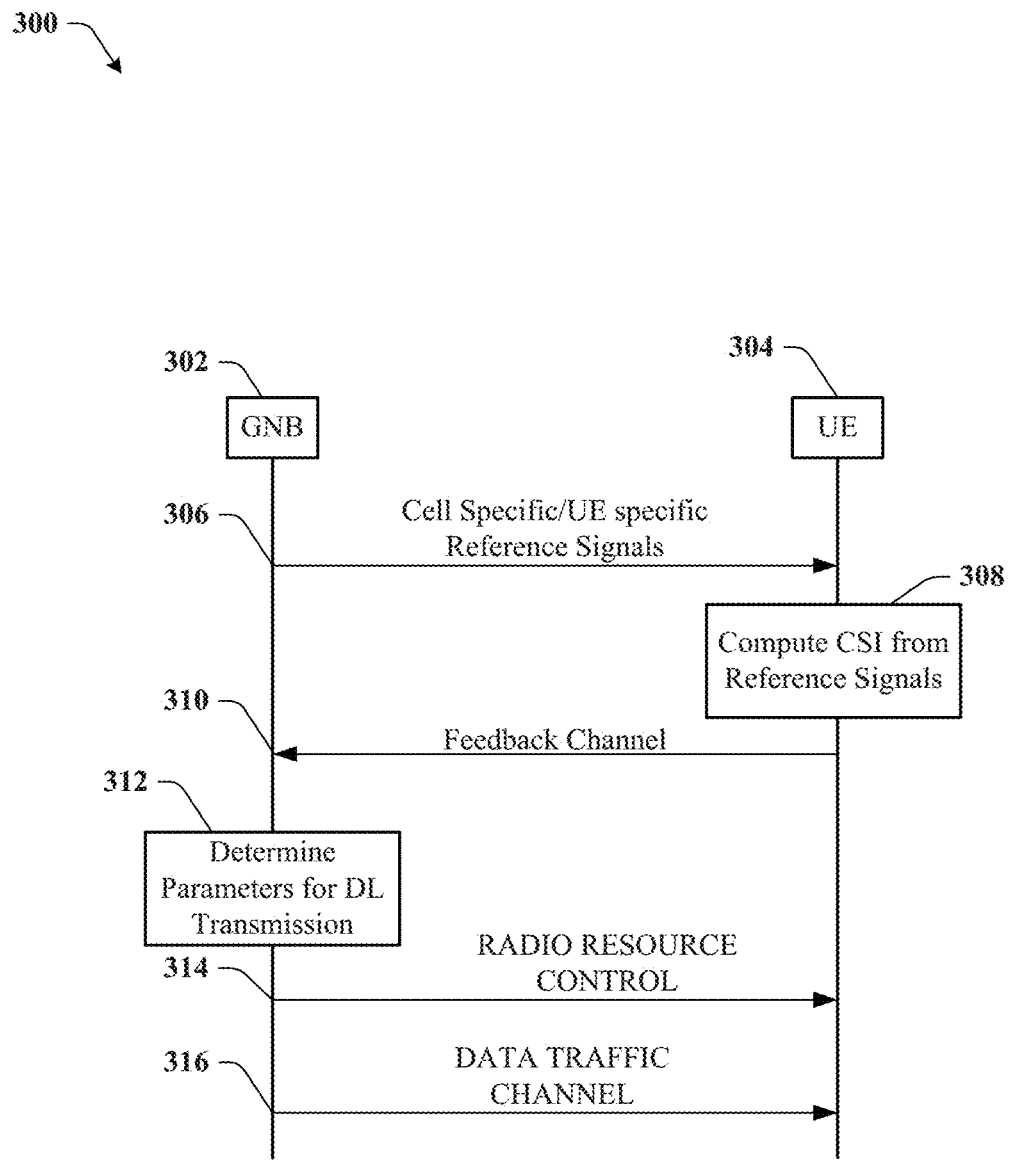
FIG. 3 illustrates an example block diagram showing a message sequence chart in accordance with various aspects and embodiments of the subject disclosure.

Turning now to FIG. 3, illustrated is an example block diagram 300 showing a message sequence chart in accordance with various aspects and embodiments of the subject disclosure. A base station device, e.g., GNB 302 can send cell specific or UE specific reference signals at 306 to a UE 304. The reference signals can each be in a different format based on the different combinations supported by the UE and GNB 302. For instance, if the rank is determined to be rank 5, supporting 5 layers, then GNB 302 would send a rank 4 reference signal on antennas 1-4, while sending a rank 1 reference signal on antenna 5. The same process would be repeated for the other 4 combinations of a rank 5 transmission, which means there would be 5 total reference signals sent by the GNB 302 to the UE 304. With rank 7 or 8 transmissions, there would be up to 35 different reference signals sent.

At 308, the UE 304 can compute channel state information from each of the reference signals, including the channel quality indicator, precoding, matrix index (PMI), rank information (RI), and CSI-RS resource indicator. The CSI report is sent to the network via a feedback channel at 310 either on request from the network a-periodically or configured to report periodically.

At 312, depending on the CSI reports, the GNB 302 can choose which of the combinations would be best based on spectral efficiency and/or capacity being above a predetermined threshold, and inform the UE 304 by sending a bit map detailing the rankings at 314 during a radio resource control signaling period. At 316, the base station device can then transmit data using the layer mapping determined at 312.

Figure 4:
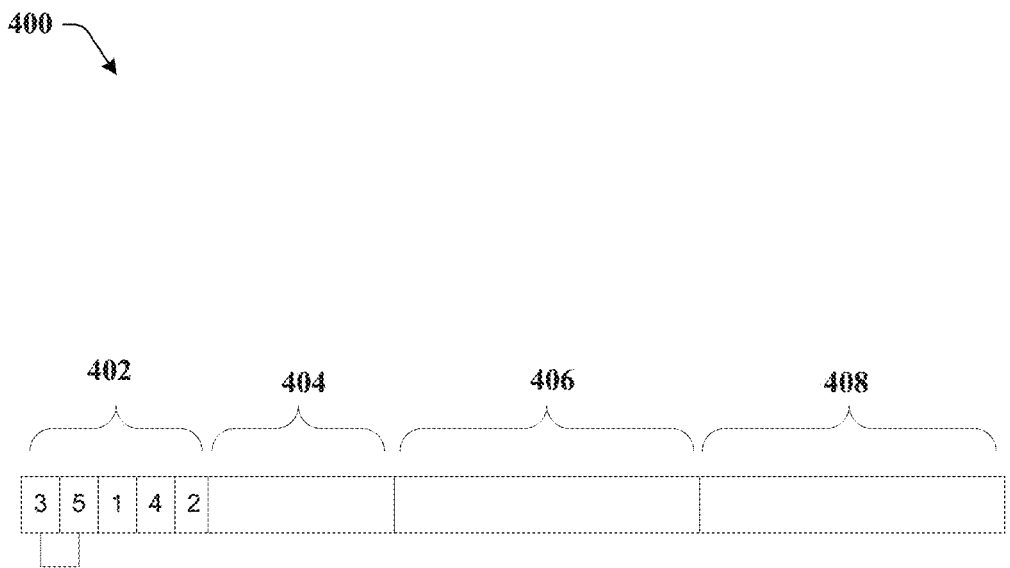
FIG. 4 illustrates an example block diagram of a bit map in accordance with various aspects and embodiments of the subject disclosure.

Turning now to FIG. 4, illustrated is an example block diagram 400 of a bit map in accordance with various aspects and embodiments of the subject disclosure. The bit map can have several sections, each section representing the range of combinations of codeword to layer mappings at different rank transmissions. For instance, section 402 can correspond to the rank 5 transmissions, 404 can correspond to rank 6 transmissions, and 406 and 408 can correspond to rank 7 and 8 transmissions respectively.

In the embodiment shown in FIG. 4, section 402 has 5 entries shown, and with the combinations ranked based on the analysis of the channel state information. For instance, in 402, the rankings can go 3, 5, 1, 4, 2, where the third indexed combination in Table 5 is the best combination where codeword 1 is mapped to layers 1, 2, 4, and 5, and codeword 2 is mapped to layer 3. Second best is combination 5 shown in Table 5. It is to be appreciated that sections 404, 406 and 408 can comprise up to 15, 35, and 35 different entries respectively, although they are not shown in FIG. 4 for the sake of simplicity.

In an embodiment, each of the sections 402, 404, 406, and 408 can comprise each of the combinations ranked from best to worst, or can include just the codeword to layer mapping combinations that have a spectral efficiency or capacity above a predetermined threshold. If there are fewer combinations than entries, the bit map can indicate that by placing null bits in the entries. The user equipment can determine which combinations to expect from the bit map by cross referencing the indexed entry with the tables 2-5 that are stored in memory on the device.

In an embodiment, the user equipment can use the combination that is listed first, or can select from whichever combinations are listed. The bit map can reduce the overall number of combinations to select from to reduce the computational complexity of dynamic layer mapping.

In another embodiment, each entry in the bit map can correspond to each of the combinations in Tables 2-5. For example, in section 402, the first entry can correspond to the fixed layer mapping combination, the second entry can correspond to combination 2 in Table 5, and etc. A null bit in the entry can indicate that the combination should not be considered, while a positive bit can indicate that the user equipment device should consider that combination.

Figure 5:
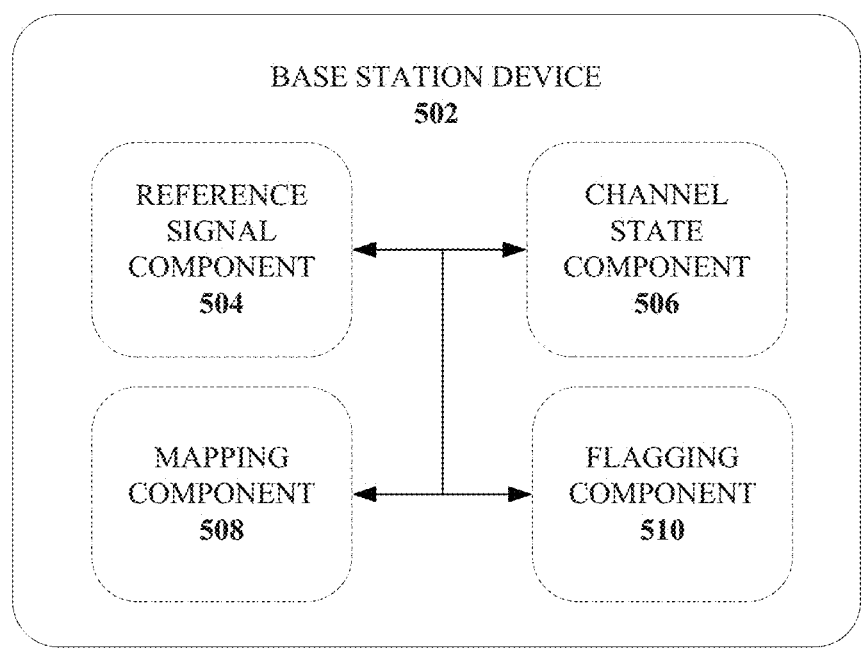
FIG. 5 illustrates an example block diagram of a base station device in accordance with various aspects and embodiments of the subject disclosure.

Turning now to FIG. 5, illustrated is an example block diagram 500 of a base station device 502 in accordance with various aspects and embodiments of the subject disclosure.

A reference signal component 504 can be provided to transmit a group of reference signals each formatted in a different combination based on the number of antennas in the base station device 502 and a user equipment device. The reference signal component 504 can send out 90 reference signals, with each signal formatted in one of the combinations in tables 2-5, or the reference signal component 504 can determine the rank of transmission based on a rank indicator received from the user equipment and send only reference signals with the combinations associated with the rank indicator.

The channel state component 506 can receive the channel state information from the user equipment and a mapping component 508 can determining a ranking of codeword to layer mapping combinations based on the channel state information report, wherein the codeword to layer mapping combinations indicate to which antenna of a multi-antenna transceiver on the user equipment device to map each codeword of a transmission. The ranking can be embodied in a bit map and sent to the user equipment in order to indicate which combination to use, or to indicate which group of combinations to choose from.

In an embodiment, the reference signal component 504 can send multiple CSI-RS (reference signals) processes where each CSI-process is configured to have one particular configuration. For example, say the base station device 502 would like to identify the best layer mapping combination for 5G MIMO with rank 5. Then the reference signal component 504 would send one CSI-process with antenna ports 1, 2, 3 and 4 and (restricting the UE to report CQI (channel quality indicator) corresponding to rank 4 only) and another CSI-RS process with antenna port 5 on rank 1. For the first CSI-RS transmissions, the UE will feedback the CQI corresponding to the rank 4 transmission say this is CQI1a, and for the second CSI-RS process it reports a CQI corresponding to rank 1 say this as CQI1b. Then let's define CQI1=CQI1a+CQI1b. The same process is repeated for all the other 4 combinations for rank 5 transmissions.

In an embodiment, a flagging component 510 can be provided to indicate to the user equipment whether to use fixed layer mapping (e.g., the combinations described in Table 1) or to use dynamic layer mapping (e.g., choose from the selected/ranked combinations in the bit map).

In an embodiment, the flagging component 510 can determine a battery life status of the mobile device, and if the battery life is below a predefined threshold or status, the flagging component 510 can send an indicator to the mobile device to use fixed layer mapping to conserve energy at the expense of decreased spectral efficiency. In other embodiments, the flagging component 510 can indicate to use fixed layer mapping based on the type of device the user equipment is. Some devices, e.g., embedded device, wearables, internet of thing device, etc., may default to fixed layer mapping due to computational capability, overall battery life, etc.

Figure 6:
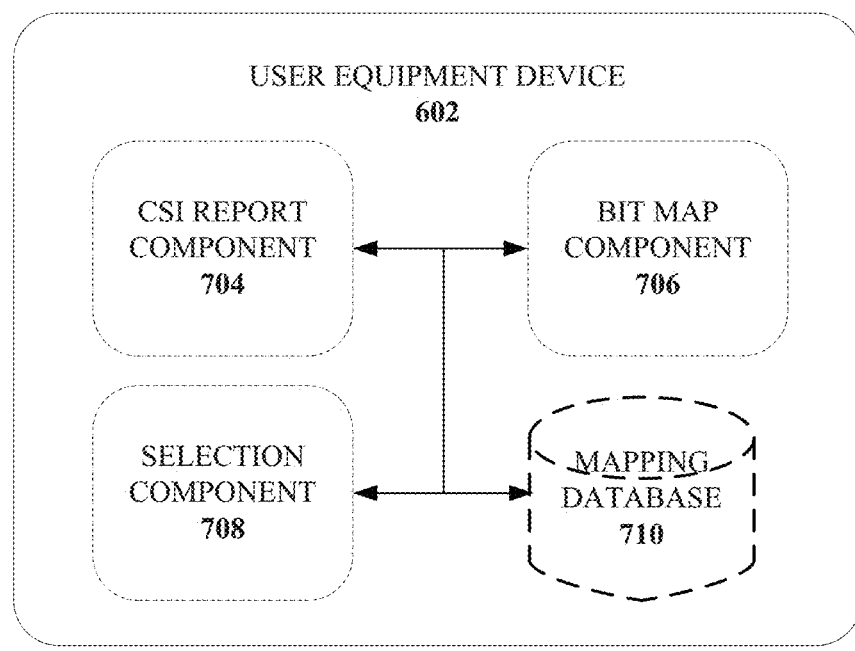
FIG. 6 illustrates an example block diagram of a user equipment device in accordance with various aspects and embodiments of the subject disclosure.

Turning now to FIG. 6, illustrated is an example block diagram 600 of a user equipment device 602 in accordance with various aspects and embodiments of the subject disclosure.

The user equipment device 602 can include a CSI report component 704 that receives a group of reference signals corresponding to each codeword to layer mapping combination and transmits channel state information (including CQI) for each reference signal of the group of reference signals to the base station device. The CSI report component 704 can append metadata or an indicator to each CSI report tagging the related reference signal so that the base station device can determine which CSI report is associated with which reference signal.

The bit map component 706 can receive a bit map comprising a ranking or selection of codeword to layer mapping combinations from the base station device, and using the mapping database 710 (which comprises information related to that in Tables 2-5) determine which combinations the bit map references.

A selection component 708 can select which of the combinations in the bit map to use based on the channel state information or can use fixed layer mapping if the base station indicates that fixed layer mapping is to be used. The selection component 708 can skip over combinations that are set to a null value to reduce the computational complexity.

Figure 7:
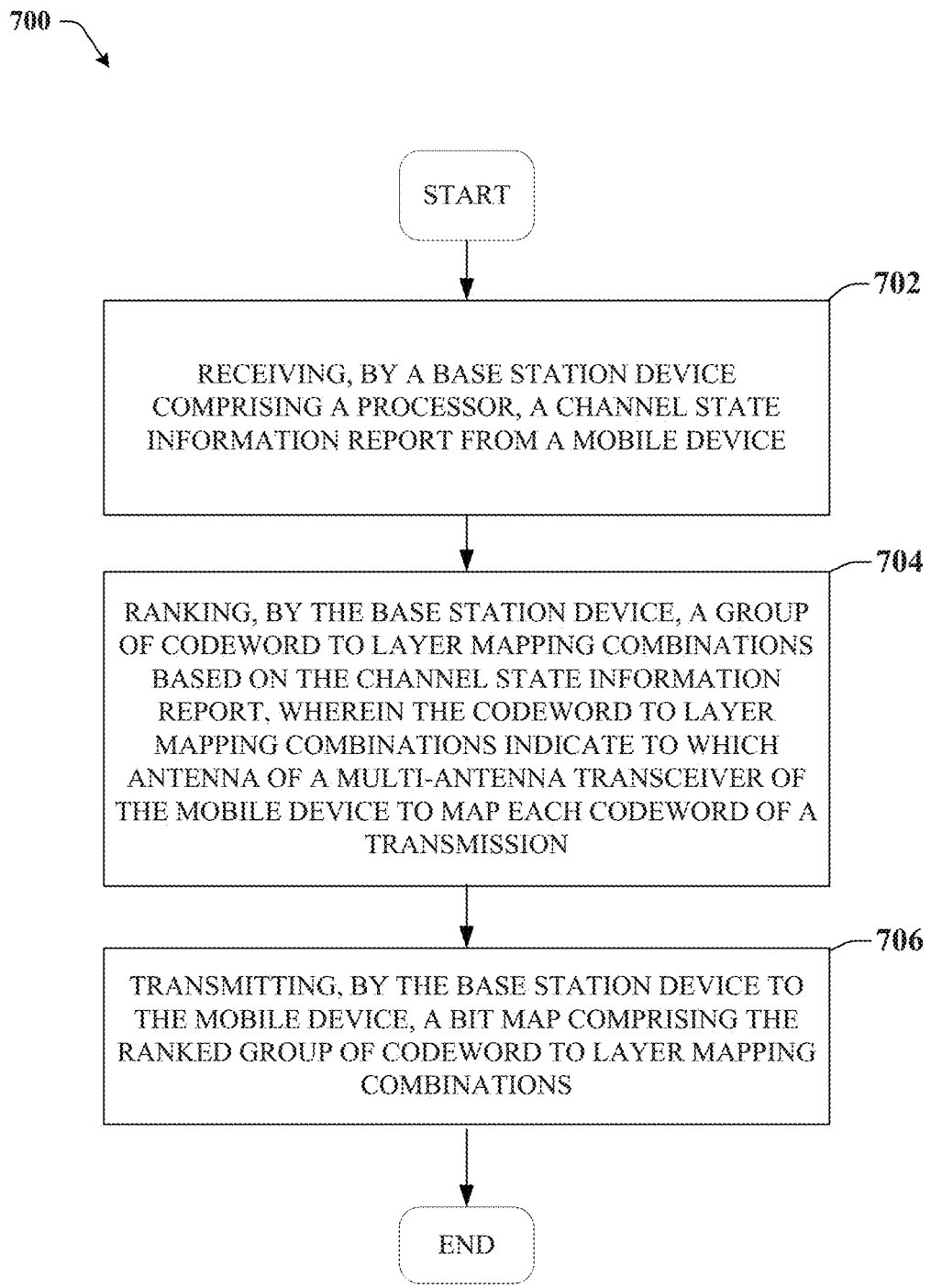
FIG. 7 illustrates an example method for ranking codeword to layer mapping combinations in accordance with various aspects and embodiments of the subject disclosure.
Figure 8:
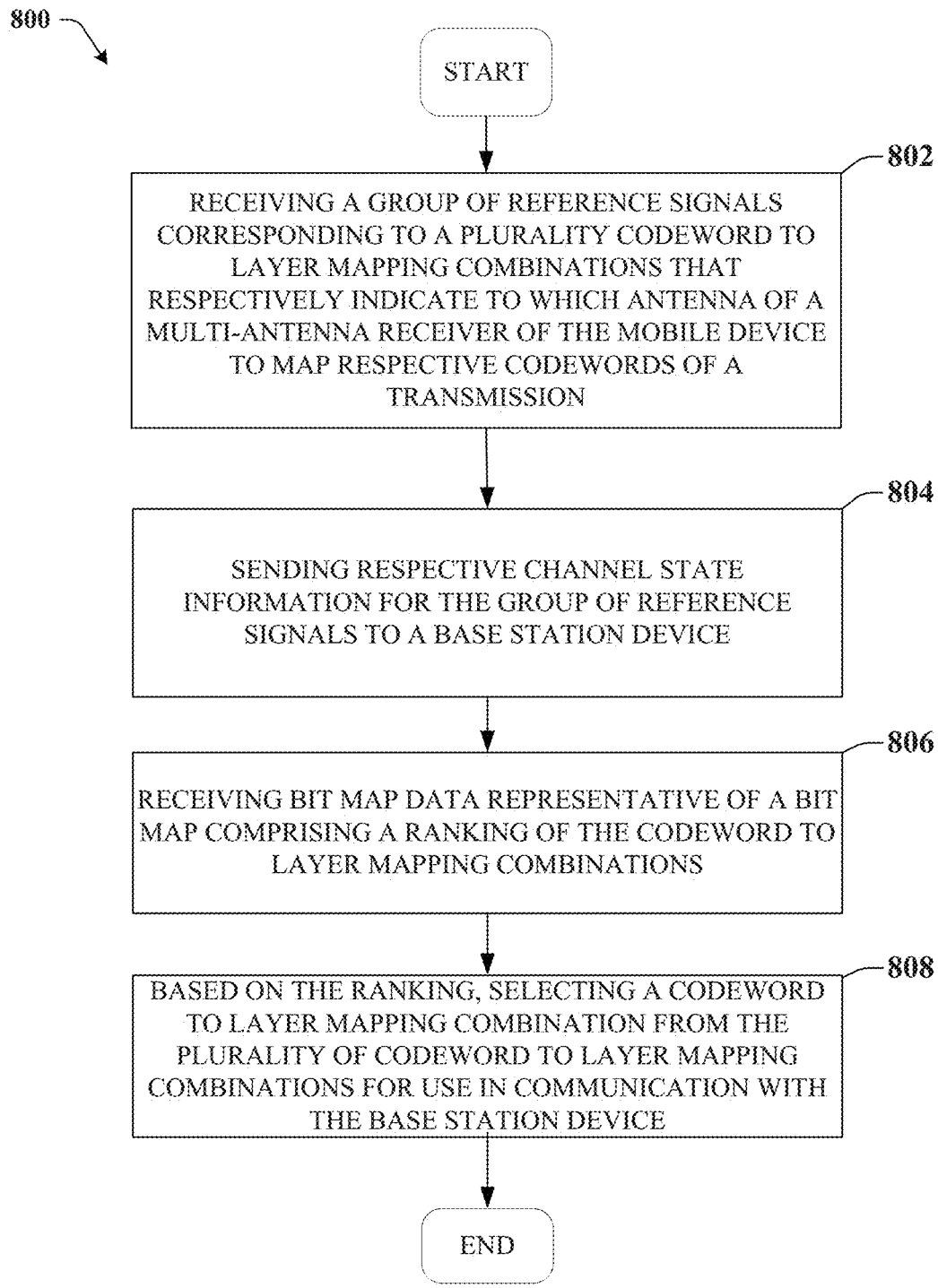
FIG. 8 illustrates an example method for implementing ranked codeword to layer mapping combinations in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for ranking codeword to layer mapping combinations in accordance with various aspects and embodiments of the subject disclosure.

Method 700 can begin at 702 where the method includes receiving, by a base station device comprising a processor, a channel state information report from a mobile device.

At 704, the method includes ranking, by the base station device, a group of codeword to layer mapping combinations based on the channel state information report, wherein the codeword to layer mapping combinations indicate to which antenna of a multi-antenna transceiver of the mobile device to map each codeword of a transmission.

At 706, the method includes transmitting, by the base station device to the mobile device, a bit map comprising the ranked group of codeword to layer mapping combinations.

FIG. 8 illustrates an example method 800 for implementing ranked codeword to layer mapping combinations in accordance with various aspects and embodiments of the subject disclosure.

Method 800 can begin at 802 wherein the method includes receiving a group of reference signals corresponding to codeword to layer mapping combinations that respectively indicate to which antenna of a multi-antenna receiver of the mobile device to map respective codewords of a transmission.

At 804, the method can include sending respective channel state information for the group of reference signals to a base station device.

At 806, the method can include receiving bit map data representative of a bit map comprising a ranking of the codeword to layer mapping combinations.

At 808, the method can include based on the ranking, selecting a codeword to layer mapping combination for use in communication with the base station device.

Figure 9:
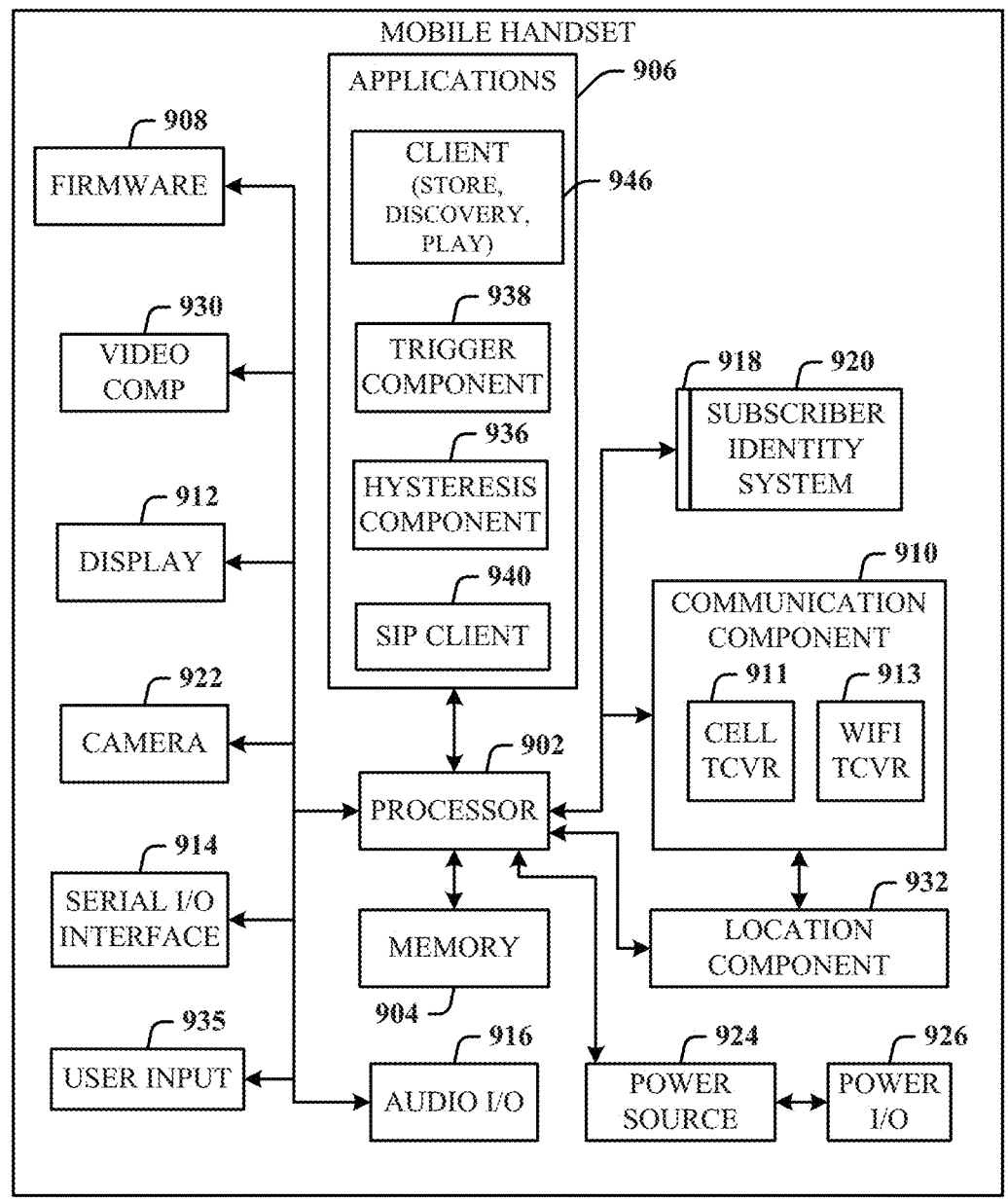
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
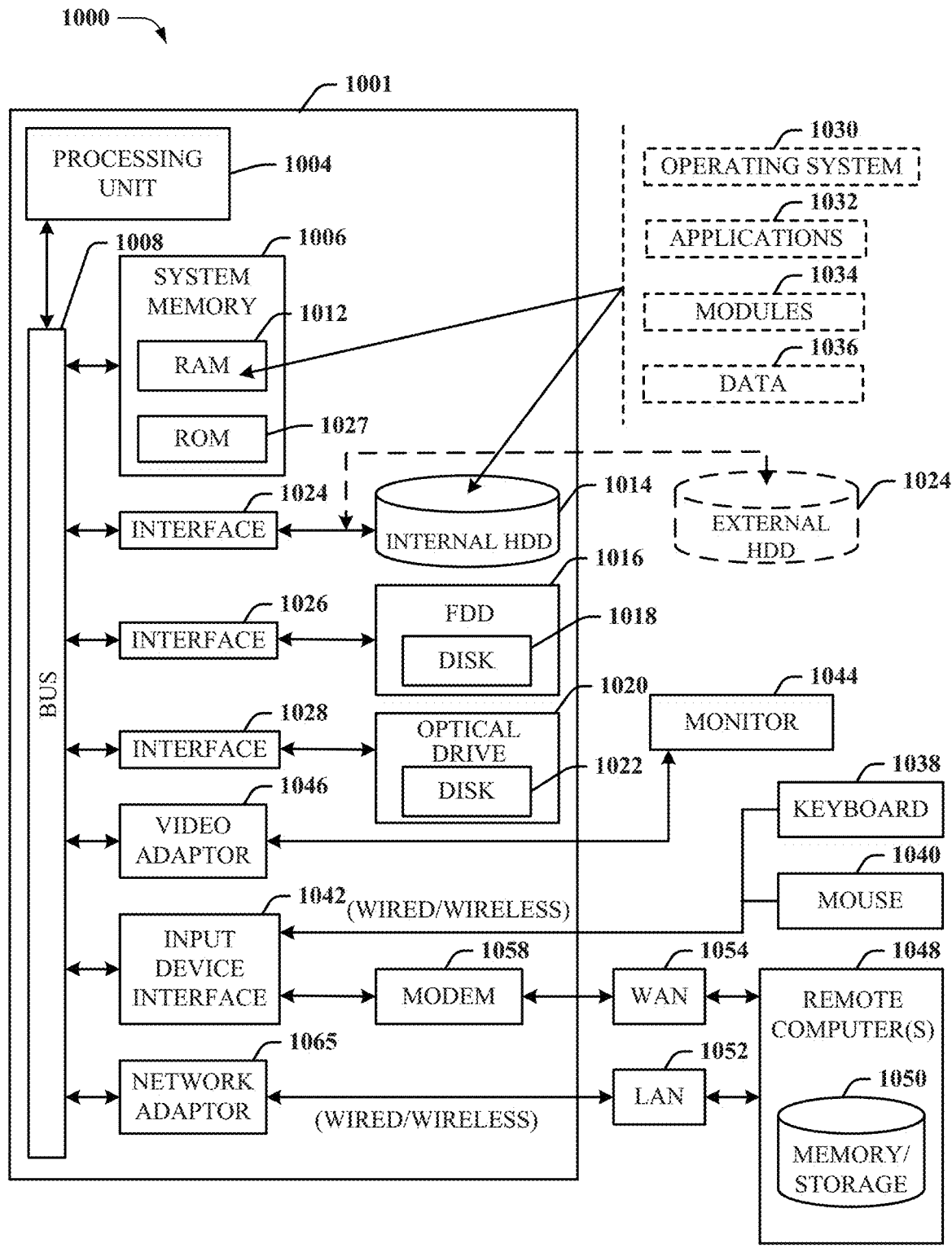
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by a wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station, comprising:
a processor; and
a memory that stores executable instructions that, when executed by the processor, facilitate performance of operations, comprising:
determining rankings of codeword to layer mapping combinations based on channel state information associated with a user equipment, wherein the codeword to layer mapping combinations indicate to which antenna, of a multi-antenna transceiver of the user equipment, to map respective codewords of a transmission; and
facilitating transmitting, to the user equipment, the rankings.

2. The base station of claim 1, wherein the facilitating of the transmitting of the rankings comprises the facilitating of the transmitting, to the user equipment, of bit map data representative of a bit map comprising the rankings.

3. The base station of claim 2, wherein the bit map comprises a first portion associated with rank 8 codeword to layer mapping combinations, a second portion associated with rank 7 codeword to layer mapping combinations, a third portion associated with rank 6 codeword to layer mapping combinations, and a fourth portion associated with rank 5 codeword to layer mapping combinations.

4. The base station of claim 3, wherein the first portion comprises up to 35 combinations, the second portion comprises up to 35 combinations, the third portion comprises up to 15 combinations, and the fourth portion comprises up to 5 combinations.

5. The base station of claim 2, wherein the facilitating of the transmitting of the bit map data further comprises:
facilitating the transmitting of the bit map data during a radio resource control signaling period.

6. The base station of claim 1, wherein the operations further comprise:
determining a battery life status of the user equipment; and
in response to the battery life status being determined to be below a threshold, signaling to the user equipment to use fixed codeword to layer mapping.

7. The base station of claim 6, wherein the fixed codeword to layer mapping is based on a standardized network protocol.

8. A method, comprising:
determining, by a base station comprising a processor, rankings of codeword to layer mapping combinations based on channel state information associated with a user equipment, wherein the codeword to layer mapping combinations indicate to which antenna, of a multi-antenna transceiver of the user equipment, to map respective codewords of a transmission; and
transmitting, by the base station to the user equipment, the rankings.

9. The method of claim 8, wherein the transmitting of the rankings comprises transmitting bit map data representative of a bit map comprising the rankings.

10. The method of claim 9, wherein the bit map comprises a first portion associated with rank 8 codeword to layer mapping combinations, a second portion associated with rank 7 codeword to layer mapping combinations, a third portion associated with rank 6 codeword to layer mapping combinations, and a fourth portion associated with rank 5 codeword to layer mapping combinations.

11. The method of claim 10, wherein the first portion comprises up to 35 combinations, the second portion comprises up to 35 combinations, the third portion comprises up to 15 combinations, and the fourth portion comprises up to 5 combinations.

12. The method of claim 9, wherein the transmitting of the bit map data further comprises:
transmitting the bit map data during a radio resource control signaling period.

13. The method of claim 8, further comprising:
determining, by the base station, a battery life status of the user equipment; and
in response to the battery life status being determined to be below a threshold, signaling by the base station, to the user equipment to use fixed codeword to layer mapping.

14. The method of claim 13, wherein the fixed codeword to layer mapping is based on a fifth generation communication network protocol.

15. A mobile device, comprising:
a processor; and
a memory that stores executable instructions that, when executed by the processor, facilitate performance of operations, comprising:
sending channel state information to base station equipment;
receiving, from the base station equipment, rankings of codeword to layer mapping combinations based on the channel state information, wherein the codeword to layer mapping combinations indicate to which antenna, of antennas of a multi-antenna transceiver of the mobile device, to map respective codewords of a transmission; and
based on the rankings and a transmission rank of the transmission, selecting a codeword to layer mapping combination from to layer mapping combinations for use to communicate with the base station equipment.

16. The mobile device of claim 15, wherein the receiving of the rankings comprises receiving bit map data representative of a bit map comprising the rankings.

17. The mobile device of claim 16, wherein the bit map comprises a first portion associated with rank 8 codeword to layer mapping combinations, a second portion associated with rank 7 codeword to layer mapping combinations, a third portion associated with rank 6 codeword to layer mapping combinations, and a fourth portion associated with rank 5 codeword to layer mapping combinations.

18. The mobile device of claim 17, wherein the first portion comprises up to 35 combinations, the second portion comprises up to 35 combinations, the third portion comprises up to 15 combinations, and the fourth portion comprises up to 5 combinations.

19. The mobile device of claim 15, wherein the operations further comprise:
sending a battery life status of the mobile device to the base station equipment; and
in response to the battery life status being determined to be below a threshold, receiving an instruction to employ fixed codeword to layer mapping.

20. The mobile device of claim 19, wherein the fixed codeword to layer mapping is based on a new radio wireless network protocol.

* * * * *